Feb. 19, 1924.

C. O. LUND 1,484,515

CONTAINER FOR FROZEN CONFECTIONS

Filed March 6, 1922

INVENTOR.
C. O. Lund
BY Milton S. Crandall
ATTORNEYS.

Patented Feb. 19, 1924.

1,484,515

UNITED STATES PATENT OFFICE.

CLINTON O. LUND, OF YANKTON, SOUTH DAKOTA.

CONTAINER FOR FROZEN CONFECTIONS.

Application filed March 6, 1922. Serial No. 541,504.

*To all whom it may concern:*

Be it known that I, CLINTON O. LUND, a citizen of the United States, and a resident of Yankton, in the county of Yankton and State of South Dakota, have invented certain new and useful Improvements in Containers for Frozen Confections, of which the following is a specification.

In the packing and refrigeration of confection pieces comprising frozen masses, as chocolate coated ice cream bars, much difficulty has been experienced, the common practice being to pack the pieces in the familiar cylindrical ice cream can within an ice-containing tub. This practice obviously suffers from the fact that only those pieces of the confection lying adjacent the wall of the can have direct refrigeration, and inasmuch as the pieces are individually wrapped, those which are isolated from the wall of the can are not kept sufficiently cold; furthermore, the removal of one or more of the pieces from the can necessitates the exposure of the entire contents.

My present invention, therefore, has for its primary object the production of an improved refrigerating container for frozen confection pieces, embodying certain novel features of construction and arrangement of parts whereby a maximum portion of the surfaces of such pieces are directly exposed to the refrigerating medium.

A further object of the invention is the production of a refrigerating container for frozen confection pieces so constructed that a minimum sized container contains a maximum number of such pieces and wherein the major portion of the surfaces of the pieces have direct refrigeration.

Still another object of the invention is the production of a refrigerating container for frozen confection pieces so constructed that one or more of the pieces may be removed without exposing the entire contents to the external temperature.

Furthermore, the invention has for an object the production of a device having the above recited characteristics which is thoroughly efficient in use, yet comparatively inexpensive in manufacture.

The above and other objects and advantages I successfully attain in the embodiments hereinafter described, defined in the appended claims and illustrated in the accompanying drawings which form a part of this application and in which like characters of reference indicate corresponding parts throughout the several views, of which,—

Referring, now, to the illustrations, I employ the usual outer casing or tub, 5, for the refrigerating-medium and in which is packed a series of individual upright containers arranged in a hollow formation and each isolated from the others and from the tub, whereby all the surfaces of the individual containers have direct contact with refrigerating-medium.

Figure 1:
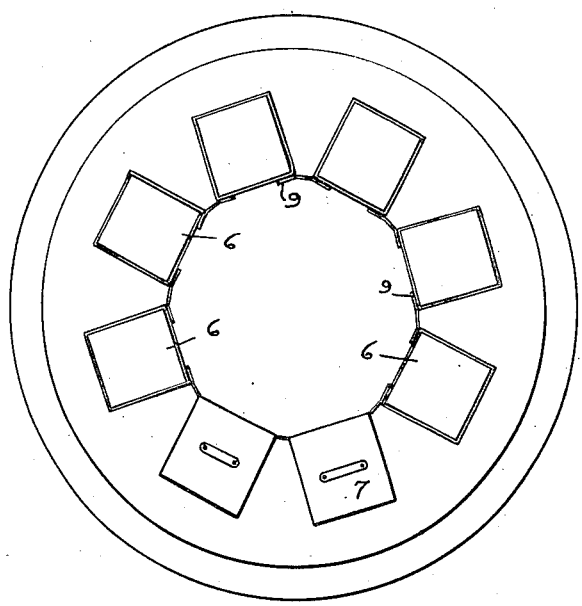
Fig. 1 is a plan of a device constructed in accordance with my invention, the covers of several of the individual containers being removed.

The individual containers may be of any suitable shape, form and size. In the embodiment presented in Fig. 1 these individual containers, represented at 6, are square or rectangular in cross section, and provided with removable covers, 7. The said containers, 6, are arranged in a circular series within the tub, 5, and in spaced relation to the wall thereof. The said containers are held against relative displacement and in uniform spaced relation by suitable pervious connecting members, preferably comprising upright sheet metal strips, 8, the side edge portions of which are suitably secured, as at 9, to adjacent containers, the intermediate portion of such strips being perforated, as at 10, which affords circulation of the refrigerating-medium around every container and between the interior and exterior of the series.

The containers, 6, are particularly intended and designed for the reception of flat-sided ice cream bars and of such cross sectional area that two sides of each bar will be in direct contact with the wall of the container, yet it will be understood, as previously stated, that the specific shape and size is arbitrary and within the choice of the manufacturer.

The bottoms of the containers, 6, are provided with feet, 13, or other suitable downwardly-projecting members, which rest upon the bottom of the tub, 5, to support the series of containers in spaced relation to the bottom of the tub to permit free circulation of the refrigerating-medium therebelow.

Figure 4:
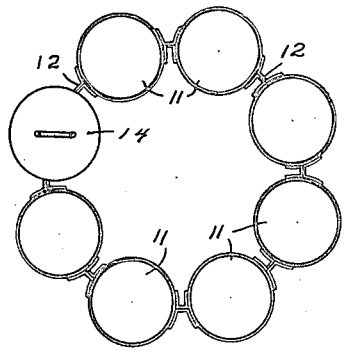
Fig. 4 is a plan of a modified form of a series of individual containers.
Figure 3:
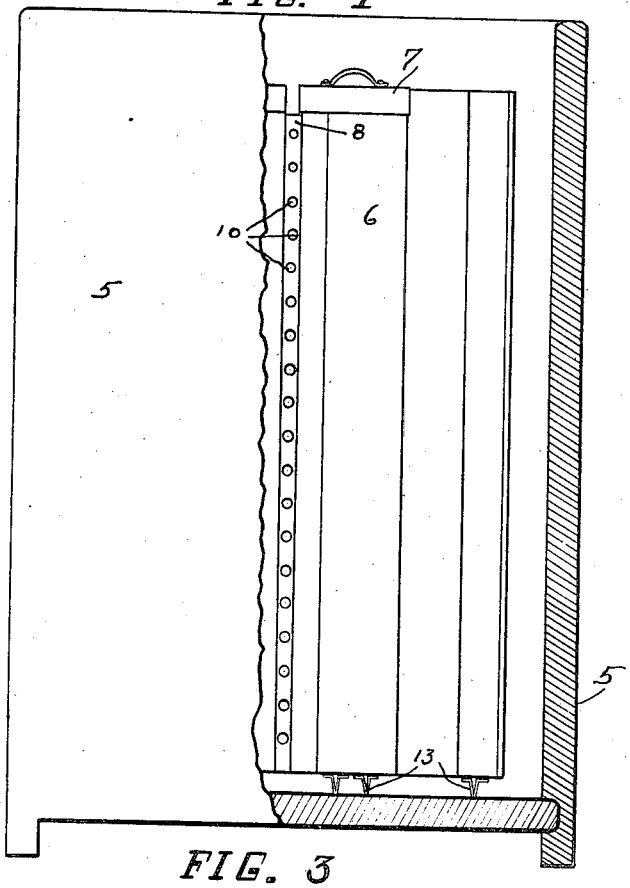
Fig. 3 is an elevation of my improved device, a portion of the refrigerating-medium container being shown in section.
Figure 2:
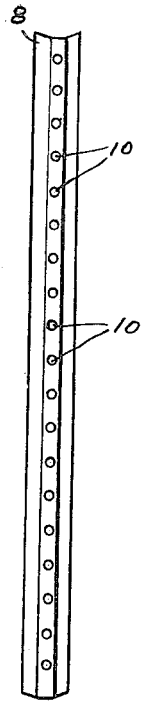
Fig. 2 is an elevation of one of the container-connecting members.

In the modification presented in Fig. 4 the hollow series of individual containers is composed of cylindrical cans, 11, the series being arranged in circular formation and the containers, 11, being held in mutually spaced relation by spacing strips, 12, suitably secured to the respective containers.

In the familiar five-gallon ice cream can packed in the usual tub, approximately 563 square inches of external surface of the can have direct contact with the refrigerating-medium, while in my improved container of the same volume approximately 1850 square inches of external surface are exposed to and in direct contact with the refrigerating-medium. When confection bars of the same size as my improved device is particularly intended for are packed in the familiar ice cream can, approximately only 65% of the bars have direct refrigeration, and of this 65% approximately only 25% of the surfaces of these bars have direct contact with the wall of the container, the remaining 35% of the bars having no direct refrigeration whatever, while in my improved container approximately 50% of the surfaces of all the bars have direct contact with the walls of the container, and all of the walls of the individual containers are directly in contact with the refrigerating-medium.

While I have illustrated and described but two embodiments of the invention, I would not be understood as being limited to such specific structures, for various alterations and modifications may be made in the details of construction and arrangement of parts herein disclosed without departing from the spirit and scope of the invention, as defined in the appended claims.

Having thus described my invention, what I claim as new and desire to secure by Letters Patent of the United States, is:

1. A refrigerating container embodying an outer casing for a refrigerating element, and a series of separate containers therein each isolated from the others and the outer casing and members connecting each container with the adjacent container to hold the container in fixed but spaced relation.

2. A refrigerating container embodying an outer casing for a refrigerating element, a series of separate upright containers arranged therein in a hollow formation, and strips interconnecting each container with the adjacent containers to hold them in spaced relation.

3. A refrigerating container embodying an outer casing for a refrigerating element, a series of separate upright containers arranged therein in a hollow formation, and upright pervious strips interconnecting each container with the adjacent containers to hold them in spaced relation and permit circulation of the refrigerating element therethrough.

4. A refrigerating container embodying an outer casing for a refrigerating element, a series of separate upright containers arranged therein in a hollow formation, upright strips having their side portions secured to adjacent containers, and their intermediate portions perforated and disposed between the containers, where the containers are held in spaced relation and the refrigerating element has free circulation through the strips.

5. A refrigerating container including a circular series of separate upright containers, rectangular in cross-section, and upright perforate strips having their side portions secured to adjacent containers, whereby the containers are each spaced from and fixed with respect to each other.

In testimony whereof, I have hereunto set my hand this 4th day of March, 1922.

CLINTON O. LUND.